US006811762B2

(12) United States Patent
Moore

(10) Patent No.: US 6,811,762 B2
(45) Date of Patent: Nov. 2, 2004

(54) AMMONIA SYNTHESIS PROCESS AND APPARATUS FOR USE THEREIN

(75) Inventor: Dewey Oren Moore, Missouri City, TX (US)

(73) Assignee: Cornelius E. Shannahan, Chappaqua, NY (US); part interest ( * ) Notice: Subject to any disclaimer, the term of this patent is extended or adjusted under 35 U.S.C. 154(b) by 85 days.

(21) Appl. No.: 10/181,203

(22) PCT Filed: Mar. 2, 2001

(86) PCT No.: PCT/US01/06749

§ 371 (c)(1), (2), (4) Date: Nov. 13, 2002

(87) PCT Pub. No.: WO01/66465

PCT Pub. Date: Sep. 13, 2001

(65) Prior Publication Data

US 2003/0211026 A1 Nov. 13, 2003

(51) Int. Cl.[7] ............................................... C01C 1/04
(52) U.S. Cl. ....................................... 423/359; 422/148
(58) Field of Search ........................... 423/359; 422/148

(56) References Cited

U.S. PATENT DOCUMENTS

| | | | | |
|---|---|---|---|---|
| 1,815,243 A | * | 7/1931 | De Jahn | 423/359 |
| 1,830,167 A | * | 11/1931 | Jones | 423/359 |
| 3,349,569 A | * | 10/1967 | Nebgen | 423/359 |
| 3,350,170 A | * | 10/1967 | Finneran et al. | 423/359 |
| 3,484,197 A | * | 12/1969 | Finneran et al. | 423/359 |

* cited by examiner

Primary Examiner—Wayne A. Langel
(74) Attorney, Agent, or Firm—Libert & Associates; Victor E. Libert

(57) ABSTRACT

A method for synthesis of ammonia includes compressing a synthesis gas containing hydrogen and nitrogen in a multi-stage (50, 56 and 57) centrifugal compressor. The synthesis gas is compressed to a pressure of from about 800 to 900 psia in the first stage (50) of the compressor, and withdrawn therefrom and subjected to cooling and dehydration by contact with liquid ammonia in a dehydrator (54). The cooled, dehydrated synthesis gas is then returned to the compressor and introduced into the second stage (56) thereof. Because of this interstage cooling and dehydration, compressor speed may be reduced and significant savings in power consumption are attained because of the favorable effect of the dehydrator (54) on the last two stages (56, 57) of the compressor. Additional power saving is realized because refrigeration requirements for the synthesis loop are reduced. Apparatus to carry out the process includes a centrifugal compressor fitted with a synthesis gas outlet (2, 4 and 6) connecting the discharge of the first stage (50) of the compressor with the synthesis gas inlet of the dehydrator (54), and a synthesis gas intermediate inlet (8) connecting the inlet of the second stage (56) of the compressor in flow communication with the synthesis gas outlet of the dehydrator (54).

12 Claims, 1 Drawing Sheet

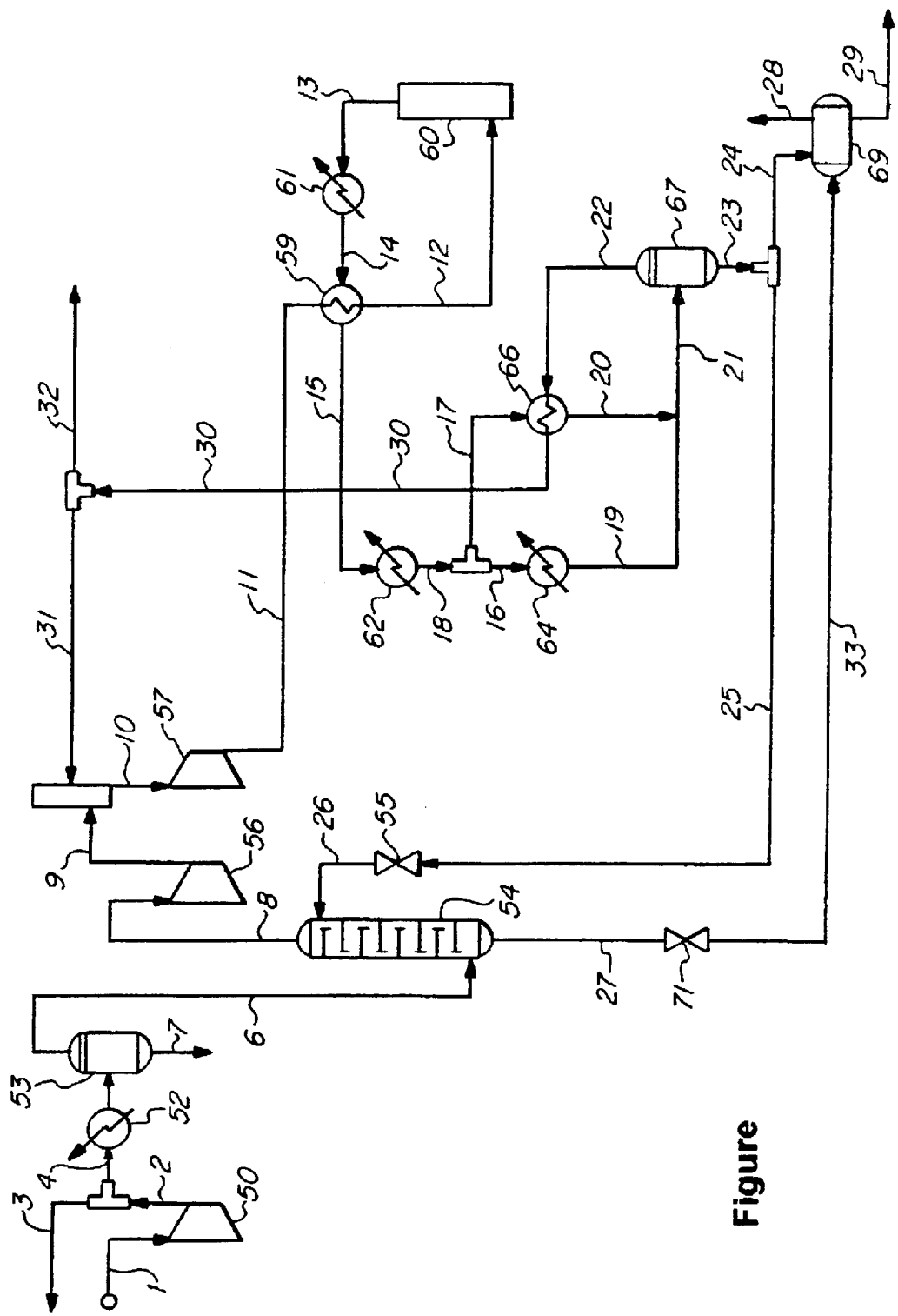
Figure

AMMONIA SYNTHESIS PROCESS AND APPARATUS FOR USE THEREIN

BACKGROUND OF THE INVENTION

The present invention relates to method and apparatus for the production of a product by catalytic reaction of a pressurized synthesis gas. For example, one embodiment of the present invention relates to the production of ammonia by catalytic reaction of pressurized synthesis gas comprising hydrogen and nitrogen. More specifically, the present invention relates to an improved method for purification of make-up synthesis gas, i.e., synthesis gas which is added to the catalytic reactor to replace reacted synthesis gas.

RELATED ART

U.S. Pat. No. 3,350,170 issued Oct. 31, 1967 to J. A. Finneran et al, discloses a process for carrying out cyclic synthesis reactions at elevated pressures and is particularly concerned with improvements in the method of compressing the fresh and recycle synthesis gases in such process. This patent well illustrates the type of synthesis process with which the present invention is concerned. As shown in FIG. 1 of U.S. Pat. No. 3,350,170, fresh synthesis gas 10 is introduced into a centrifugal compressor together with gas 42 recycled from a converter 38 in which hydrogen and nitrogen are catalytically converted to ammonia. The recycle gas exiting from converter 38 thus contains product ammonia as well as unreacted hydrogen and nitrogen. The recycle gas is reintroduced via line 24 into the compressor. The compressed outlet gas 26 thus comprises a mixture of the recycle gas plus the fresh (make-up) gas introduced via line 10. The product ammonia is separated in separation vessel 31 and the ammonia-depleted compressed synthesis gas travels to the converter 38 via lines 33, 34 and 35. Line 46 is used to separate a purged gas from the synthesis loop in order to prevent build-up of impurities in the synthesis loop defined by lines 42, 24, 26 and 33.

In conventional ammonia synthesis processes, removal of $H_2O$ from make-up synthesis gas is accomplished by mixing make-up gas containing about 160 ppm $H_2O$ with recycle gas at the compressor recycle wheel inlet. The gas discharged from the compressor is then cooled and chilled with $H_2O$ being absorbed in the condensing $NH_3$. The $NH_3$ and absorbed $H_2O$ are separated from the gas in a separator. The converter is fed with gas from the separator, which separated gas is substantially $H_2O$-free or at least has only a very small residual $H_2O$ content. The separated gas may contain, for example, about 1.9% $NH_3$. There are several disadvantages with this system. The refrigeration power required is higher because of the dilution of converter effluent with make-up gas that lowers the $NH_3$ concentration and the dewpoint. This transfers load from the higher to the lower temperature chillers, which require more power per ton of refrigeration. Also, product $NH_3$ is compressed in the recycle wheel, adding to the power demand imposed on the compressor. A significant improvement in reduced energy requirements can be realized for this system, as shown in U.S. Pat. No. 1,815,243, by incorporating a dehydrator.

A 1989 paper by H. Bendix and L. Lenz of VEB Agrochemie Piesteritz, the former German Democratic Republic (East Germany), was presented at a meeting of the American Institute of Chemical Engineers. The paper is entitled *Results and Experiences on Revamping of Large-Scale Ammonia Single-Line Plants* and discloses the addition, via a Venturi tube, of liquid ammonia to the synthesis gas discharged from the third stage of the synthesis gas compressor. The stated purpose is to dry the synthesis gas.

A paper by M. Badano and F. Zardi was presented at the 28 Feb.–2 Mar. 1999 Nitrogen '99 meeting in Caracas, Venezuela sponsored by British Sulphur Publishing. The paper is entitled *Casale Group Experience in Revamping Ammonia, Methanol and Urea Complexes* and discloses scrubbing with liquid ammonia, ammonia synthesis gas between the second and third stages of the synthesis gas compressor.

Another prior art expedient is shown in U.S. Pat. No. 1,830,167 and Canadian Patent 257,043. This method involves scrubbing the combined make-up and recycle gas stream with liquid $NH_3$ prior to preheating the stream and sending it to the converter. Normally, there is no need to scrub the recycle stream since there are no impurities in it. A drawback of the scheme of these patents is that it distributes impurities through the entire gas stream. It is then more difficult to effect complete impurity removal because the impurities are diluted by being dispersed throughout the entire gas stream. In order to treat the combined stream, the scrubbing apparatus must be much larger and more costly than would be required for scrubbing the makeup gas stream alone, since it is treating a gas volumetric flow which is 4–5 times greater than the make-up gas stream alone. Accordingly, the scheme of U.S. Pat. No. 1,815,243 and Canadian Patent 257,043 adds to the scrubbing load by combining the recycle and make-up streams prior to scrubbing.

Other prior art expedients include the use of molecular sieves to remove $H_2O$ from make-up gas by adsorption. The concept of dehydrating make-up gas permits the stream with the highest $NH_3$ content, the effluent from the converter, to feed the chilling system. This saves considerable refrigeration power and can allow a significant capacity increase in plants that are limited by the size of the refrigeration compressor. The power savings is accomplished because of the elevated dew point that results in some condensation with cooling water and a transfer of load from the low to the high temperature chillers which need less power per ton of refrigeration. Removal of $H_2O$ by molecular sieves also enables omitting the purge gas chiller that uses the coldest $NH_3$ refrigeration.

The $H_2O$-free (and $NH_3$-free) make-up gas is then mixed with recycle gas, compressed in the recycle wheel and fed to the converter. This system has one advantage over competing technologies, which is that the converter feed has a low $NH_3$ content, about 1.4%. However, this advantage is offset by other factors such as the heat required for regeneration of the molecular sieves, the operating complexity because of the requirement for numerous switching valves needed for the cyclic operation to adsorb and desorb $H_2O$ from the molecular sieves, higher maintenance costs and the high capital cost of the molecular sieve vessels, heat exchangers, filters, piping and valves. The energy saving is estimated to be about 0.53 MM Btu/ST (where ST means short ton or 2000 pounds), compared to a standard secondary flash design.

Another prior art concept is shown in U.S. Pat. No. 3,349,569. This patent discloses installation of an $NH_3$ scrubber at the inlet of the synthesis gas compressor, to use liquid $NH_3$ to absorb $H_2O$ from make-up synthesis gas. This allows make-up gas to be mixed with the recycle gas and to be fed directly to the ammonia converter. The converter effluent then goes directly to a cooling/chilling system of the type described above in connection with the use of molecular sieves. A substantial chilling effect takes place because of the heat required to vaporize $NH_3$, which comes from chilling the make-up gas. The essentially $H_2O$-free make-up gas, which contains about 4.9% $NH_3$, is then mixed with recycle gas as described above in connection with the use of molecular sieves.

There are several disadvantages with this system. Overchilling of make-up gas due to excessive $NH_3$ evaporation resulting from low pressure results in a scrubber overhead and compressor inlet temperature (−27° F.) which is below the minimum (−20° F.) for standard materials of construction. More expensive low-temperature materials of construction are needed for the scrubber, and the compressor will have to be re-rated (if possible). A re-rating of the compressor can sometimes be done if its original materials of construction were satisfactory for more severe operating conditions. Otherwise, an upgrade of the compressor low pressure case may be required and this is costly. Another disadvantage of this method is that $NH_3$ will be contained in recycle gas sent to the front end of the plant for desulfurization, thereby lowering plant efficiency. This $NH_3$ will be decomposed into $H_2$ and $N_2$ in the reforming section setting up a recycle loop. The suction scrubber is also at a disadvantage from a moisture removal standpoint since the equilibrium $H_2O$ content, although low, will be about two to three times higher than with the synthesis loop dehydrator of the present invention. The main disadvantage, however, of this prior art system stems from its low pressure operation and the resulting addition of a substantial quantity of $NH_3$ to the converter feed gas which contains about 2.6% $NH_3$. This reduces the energy savings potential to about 0.45 MM Btu/ST compared to a standard design with secondary flash (e.g. U.S. Pat. No. 1,815,243).

The version of the suction scrubber as described in U.S. Pat. No. 3,349,569 can use further cooling and chilling between compressor stages to condense some of the $NH_3$ that was vaporized in the compressor inlet scrubber in the first place. The liquid $NH_3$ formed serves to further purify the synthesis gas by random absorption of some of the remaining impurities. However, the refrigeration requirements of such a system would be prohibitive.

Yet another prior art system places the scrubber at the same pressure as the synthesis loop, i.e., about 1900 psia, which leads to its one advantage: minimizing the $NH_3$ content in the scrubber overhead (2.7%) and in the converter feed (2.1%). There are, however, a number of disadvantages to this scheme. The most important one is the necessity to modify the second-stage case of the compressor in the case of a revamp of a 1900–2000 psia synthesis loop. A fourth nozzle must be added (a change that has never been done before) and the recycle wheel must be reduced in size. For the less common higher pressure loops (2500–3000 psia), the compressor second case already has four nozzles so addition of a nozzle is not an issue here. The risk involved with this type of modification of the compressor is substantial, since a number of problems (vibration, surge, oil leakage, bearing failure, etc.) can result. Further, the cost of the system for a retrofit is expected to be very high because of the compressor modification, the required addition of two more heat exchangers (scrubber inlet coolers) and the need for an $NH_3$ pump. There is no compressor speed reduction as there is no $NH_3$ evaporation and subsequent chilling for the make-up (first or second stages). Energy savings for a system with 36° F. scrubber feed (avoiding a freezing problem) is expected to be about 0.44 MM Btu/ST.

SUMMARY OF THE INVENTION

Generally, the present invention provides a process and apparatus for producing ammonia from a pressurized synthesis gas comprising a mixture of hydrogen and nitrogen, which utilizes a dehydrator to remove $H_2O$ from the synthesis gas at an intermediate stage of the synthesis gas compressor.

In a preferred embodiment, the present invention provides for the use of substantially anhydrous liquid $NH_3$ for scrubbing and subsequent cooling in the dehydrator of synthesis gas withdrawn between the first and second stages of a multi-stage compressor. This effects purification of the make-up gas and also reduces compression power requirements.

The present invention further integrates the improved purification step in the synthesis loop in such a way as to enhance the efficiency of the processing steps. Scrubbing make-up synthesis gas with liquid $NH_3$ to remove impurities (mainly $H_2O$) allows the synthesis gas to be mixed with recycle gas and fed directly to the converter. More specifically, purification of the make-up gas allows that gas to be mixed with $NH_3$-lean gas for feeding the third or recycle stage of the compressor and then, the converter. Product $NH_3$ is not compressed in the recycle wheel, which saves power. Converter effluent can be sent directly to the cooling/chilling system for $NH_3$ condensation, thereby avoiding dilution with make-up gas and reducing refrigeration requirements. Power expenditure is thus reduced as compared to prior art systems. Product $NH_3$ is removed prior to recycle compression.

The present invention, as compared to prior art schemes, reduces compression power requirements and process energy requirements, allows the option for raising plant capacity, reduces compressor speeds, operates the purification step (removal of $H_2O$ and other oxygenated impurities) at a pressure which is high enough to achieve sufficient purification without having to resort to further processing steps, and eliminates the prohibitively expensive compressor interstage refrigeration requirements required in some prior art schemes.

Specifically, in accordance with the present invention there is provided an improvement in a process for the manufacture of ammonia. The process comprises compressing in a multistage compressor a synthesis gas comprising hydrogen and nitrogen, each stage of the compressor having an inlet and a discharge associated therewith, contacting the compressed synthesis gas in an ammonia reactor with a suitable catalyst under conditions to promote the reaction of a portion, less than all, of the hydrogen and nitrogen in the synthesis gas to ammonia, separating product ammonia from a reactor effluent stream discharged from the ammonia converter, and recycling a portion of the reactor effluent stream containing unreacted hydrogen and nitrogen to the multi-stage compressor. The process includes withdrawing a make-up synthesis gas stream from the compressor and cooling and dehydrating the withdrawn synthesis gas stream, the dehydrating step being carried out by contacting the withdrawn synthesis gas stream with liquid ammonia, and returning the cooled and dehydrated synthesis gas stream to the compressor. The improvement comprises that the withdrawn synthesis gas stream is withdrawn from the discharge of the first stage of the compressor and returned to the compressor at the inlet of the second stage of the compressor.

Another aspect of the invention provides that the entire synthesis gas stream is withdrawn from the discharge of the first stage of the compressor and cooled and dehydrated.

In a specific aspect of the invention, the multi-stage compressor is a three-stage compressor and the synthesis gas is discharged from the first stage at a pressure of from about 800 to 900 psia, is discharged from the second stage of the compressor at a pressure of about 1800 to 1900 psia, and is discharged from the third stage of the compressor at a pressure of about 2000 to 2100 psia.

In one aspect of the invention, the withdrawn synthesis gas stream is cooled to a temperature of from about −20.5 to −26.1° C. (−5 to −15° F.) prior to being returned to the compressor.

In another aspect of the present invention, the synthesis gas stream is returned to the compressor from the dehydrator without being warmed.

Another aspect of the invention provides that the $H_2O$ content of the withdrawn synthesis gas stream is reduced to less than 0.1 parts per million by volume prior to being returned to the compressor.

The invention also includes cooling the synthesis gas withdrawn from the compressor to condense ammonia contained therein and removing the condensed ammonia from the synthesis gas prior to introducing it into the ammonia converter.

The synthesis gas typically contains hydrogen and nitrogen in a molar ratio of about 3:1.

Yet another aspect of the invention provides an improvement in an apparatus for carrying out a process for the manufacture of ammonia by compressing in a multi-stage compressor having at least a first stage and a second stage a synthesis gas comprising hydrogen and nitrogen, each stage of the compressor having an inlet and a discharge associated therewith. The process comprises contacting the compressed synthesis gas in an ammonia reactor by contacting the compressed synthesis gas with a suitable catalyst under conditions to promote the reaction of a portion, less than all, of the hydrogen and nitrogen in the synthesis gas to ammonia and separating product ammonia from a reactor effluent stream discharged from the ammonia converter. The process further comprises recycling a portion of the reactor effluent stream containing unreacted hydrogen and nitrogen to the multi-stage compressor, and contacting the make-up synthesis gas with liquid ammonia in a dehydrator having a synthesis gas inlet, a synthesis gas outlet and a liquid ammonia inlet and a liquid ammonia outlet. The improvement to the apparatus comprises that the compressor is fitted with (a) a synthesis gas outlet connecting in flow communication the discharge of the first stage with the synthesis gas inlet of the dehydrator, and (b) a synthesis gas intermediate inlet connecting the inlet of the second stage in flow communication with the synthesis gas outlet of the dehydrator, whereby to define a synthesis gas flow path from the discharge of the first stage, through the dehydrator, thence to the inlet of the second stage.

The synthesis gas and liquid ammonia inlets and outlets are preferably arranged to flow the liquid ammonia countercurrently to the synthesis gas in the dehydrator.

An apparatus aspect of the present invention provides that the apparatus further comprises a heat exchanger to cool the synthesis gas and a liquid-vapor separator to separate $H_2O$ therefrom, the heat exchanger and liquid-vapor separator being disposed in the synthesis gas flow path between the first stage of the compressor and the synthesis gas inlet of the dehydrator.

BRIEF DESCRIPTION OF THE DRAWING

The sole FIGURE is a schematic flow chart illustrating an embodiment of the present invention.

DETAILED DESCRIPTION OF THE INVENTION

In the manufacture of ammonia, synthesis loop make-up gas from the front section of the plant consists mainly of a mixture of hydrogen ($H_2$) and nitrogen ($N_2$) in approximately a 3:1 molecular ratio. The gas also contains lesser amounts of inerts such as methane ($CH_4$) and argon (Ar) as well as undesirable trace impurities such as carbon monoxide (CO), carbon dioxide ($CO_2$) and water vapor ($H_2O$). In an ammonia synthesis loop, it is imperative that oxygen-containing compounds including $H_2O$ be removed before the gas is introduced to the ammonia converter, as they are poisons to the synthesis catalyst. Such compounds tend to oxidize the catalyst, having a deleterious effect on it.

The present invention uses liquid $NH_3$ in a dehydrator to absorb $H_2O$ and minor amounts of other impurities from make-up synthesis gas at an intermediate stage of compression of the gas. This allows make-up gas to be mixed with recycle gas and fed to the ammonia converter with converter effluent then going directly to the cooling/chilling system. In accordance with the present invention, the dehydrator treats gas taken from an intermediate stage of the compressor. For most applications, e.g., 2000 psia synthesis loops with two make-up compression stages, the scrubber treats gas at the inlet of the second stage of the synthesis gas compressor and operates at medium pressure. For these designs, the dehydrator will operate at pressure of about 800–900 psia. For less common higher pressure synthesis loops (2500–3000 psia) with three make-up stages, the dehydrator will better be placed between the second and third stages of the compressor and operate at a pressure of about 1200–1400 psia.

Just as there is an optimal operating pressure for the $NH_3$ synthesis loop (about 1500–2500 psia depending on several factors), there is an optimal operating pressure for the $H_2O$ removal operation involving contact with liquid $NH_3$. For standard synthesis loops operating at 1900–2000 psia the optimal $H_2O$ removal operating pressure has been found to be 800–900 psia, which is the operating point between the two compressor cases. This pressure range has been found to be best due to the following factors:

Enhanced energy saving (about 0.50 MM Btu/ST for plants with an energy requirement of 32 MM Btu/ST)

Enhanced compressor speed reduction (up to about 3% for the synthesis gas compressor and about 4 to 5% for the refrigeration compressor).

Enhanced potential capacity increase (3–4% if synthesis gas compressor turbines limit)

Reduced complexity (no recycle of $NH_3$ to front end)

Reduced capital investment (no special expensive materials of construction are required, no modifications to the synthesis gas compressor are needed, and no additional exchangers such as the scrubber inlet coolers for the high pressure unit are required, no extra interstage refrigeration is needed).

The discussion below pertains to a standard $NH_3$ synthesis loop using a three-stage synthesis gas compressor (two make-up stages and one recycle stage). For this synthesis loop, the dehydrator is, in accordance with the present invention, located between the first two compression stages. This location has been found to be the optimal position (optimal operating pressure) for a number of reasons previously given.

Referring to the sole FIGURE which schematically illustrates the dehydrator employed in a nominal 2000 psia ammonia synthesis loop, the make-up synthesis gas stream 1, derived from well-known prior process steps (such as steam reforming of hydrocarbon feed followed by shift conversion, $CO_2$ removal and methanation) enters at a pressure of about 300–400 psia. There can be some variation of this pressure depending on the upstream design but this has no bearing on the present invention. The gas consists mainly of reactants hydrogen ($H_2$) and nitrogen ($N_2$) in an approximate molar ratio of 3:1. Other components such as methane ($CH_4$) and argon (Ar) are usually present in small amounts (about 1% total). Oxygen containing impurities such as carbon monoxide (CO), carbon dioxide ($CO_2$) and water vapor ($H_2O$) are also present. The carbon oxides have already been virtually eliminated from gas stream 1 by the upstream methanator, but $H_2O$ must still be removed prior to introducing the synthesis gas to the loop and allowing it to enter the $NH_3$ converter 60.

Gas stream 1 is compressed to about 800–900 psia in the first stage 50 of a synthesis gas centrifugal compressor. The discharge stream 2 from the first stage is split, with a portion thereof, stream 3, being routed to the front end of the plant for use as hydrodesulfurization gas, as is known in the art. The bulk of gas stream 2 is flowed via stream 4 to heat exchanger 52 (which may consist of several different units) and cooled therein to a temperature of about 4.4° C. (40° F.). Most of the $H_2O$ present is condensed and separated in drum 53 and exits the system as stream 7.

Stream 6, containing about 160 ppm $H_2O$, is the vapor stream leaving the drum 53 and flowing to dehydrator 54, where it is scrubbed with essentially anhydrous $NH_3$ contained in stream 26. Dehydrator 54 can be one of any number of known gas-liquid contacting devices that bring gas and liquid phases into intimate contact with each other for the purpose of a diffusional exchange. Water in the gas phase is absorbed by ammonia in the liquid phase within dehydrator 54, which typically may be a tower using bubble cap trays, sieve trays, packing, or any suitable known means to effectuate intimate vapor-liquid contact. For this application, bubble cap trays are preferred for insuring adequate vapor-liquid contact because a level of liquid is maintained on each tray. The gas is contacted countercurrently with liquid $NH_3$ for removal of most of the impurities and essentially all of the $H_2O$. In the tower of dehydrator 54, gas flows upwardly and contacts liquid flowing downwardly. In absorption, the component being absorbed is depleted in the gas phase as it moves up the column and increased in the liquid phase as it flows down.

The final water content in the exit gas will be that in equilibrium with liquid leaving the stage (nearly pure $NH_3$ with a very small amount of $H_2O$). The water content in the exit gas must be below 10 ppm such that the converter feed gas, after dilution with recycle gas, will contain no more than 1–2 ppm $H_2O$. In actual practice, it is expected that the water content will be much lower and virtually non-detectable. By calculation, the $H_2O$ concentration in the vapor is reduced to less than 0.1 ppm after the first theoretical tray, and to essentially zero after the second theoretical tray. Although the $H_2O$ content is expected to be this low, the effectiveness of the dehydrator will not be materially compromised even if the $H_2O$ content of the overhead is somewhat higher (up to about 5 ppm). Experimental data reported in U.S. Pat. No. 3,349,569 concerning water/ammonia equilibria indicates that the $H_2O$ content in overhead stream 8 leaving dehydrator 54 would be satisfactorily low (in the range of 1 ppm after correcting for inlet concentration and operating pressure). A substantial cooling effect takes place to provide the heat for vaporization of $NH_3$ that saturates the gas. The dehydrated scrubber overhead leaves as stream 8 at a temperature of about −10° F. containing about 3.5% $NH_3$. A liquid level is maintained in the bottom of the tower comprising dehydrator 54 and net liquid leaves as stream 27.

The overhead exit stream 8 is compressed to about 1900 psia in the second stage 56 of the compressor. Discharge stream 9 from second stage 56 is then mixed with recycle gas from stream 31 to form stream 10, which is further compressed to about 2030–2080 psia in the third stage 57 of the compressor. The third stage 57 is sometimes referred to as the "recycle wheel". The exact discharge pressure will depend on the synthesis loop pressure drop, which is a function of specific loop design, capacity, $NH_3$ conversion and other factors. The combined makeup and recycle gas stream 11 then exits the third stage 57 of the compressor and is preheated in feed/effluent heat exchanger 59. The preheated gas then flows as stream 12, containing about 2.3% $NH_3$, to ammonia converter 60. Here the $NH_3$ synthesis reaction takes place over a catalyst, the reaction being shown by the following equation.

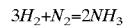

$$3H_2+N_2=2NH_3$$

Converter exit gas stream 13, containing from about 12 to 20% $NH_3$, usually about 15 to 17% $NH_3$, then flows through heat recovery heat exchanger 61. Gas leaves this heat exchanger 61 as stream 14 and is further cooled in heat exchanger 59, and leaves it as stream 15. Further cooling of the gas stream 15 is effected with cooling water in heat exchanger 62. Exit gas emerges from water-cooled exchanger 62 as stream 18 which is split as shown into streams 16 and 17 which enter, respectively, heat exchangers 64 and 66. Additional cooling with a suitable refrigerant, such as $NH_3$, is carried out in heat exchanger 64, which may consist of several units using progressively colder levels of refrigeration. Refrigeration recovery is carried out in heat exchanger 66. Respective exit streams 19 and 20 are then combined into stream 21 which flows to product separator 67. Here, $NH_3$ product is removed as the liquid phase, stream 23. The vapor phase, stream 22, returns to heat exchanger 66 for refrigeration recovery as noted above. Rewarmed vapor, stream 30, is split with the smaller stream 32 being purged to fuel to remove inerts. Most of the stream is returned to the compressor as recycle stream 31. It will be noted that a purge gas (line 32) chiller and separator are not required in the illustrated arrangement.

The liquid stream from product separator 67, stream 23, is split with a portion being routed to the dehydrator 54 as stream 25. The pressure of stream 25 is reduced across flow control valve 55, with exit stream 26 from valve 55 flowing to the top of the dehydrator. The rest of the high pressure liquid from product separator 67 goes to letdown drum 69 as stream 24. This vessel operates at reduced pressure, about 250–270 psia. Dehydrator bottoms liquid $NH_3$ stream 27, containing $H_2O$ and minor amounts of other impurities removed from the make-up synthesis gas, is taken out through level control valve 71 and sent to drum 69 via stream 33. Flash gas, stream 28, leaves letdown drum 69 overhead as fuel while liquid $NH_3$ product, stream 29, is removed from the bottom of letdown drum 69.

Referring to the FIGURE, the temperature of the gas exiting the dehydrator 54 via overhead stream 8, and its $NH_3$ concentration, will vary somewhat as they are a function of the feed gas temperature (stream 6), the liquid $NH_3$ temperature (streams 25 and 26) and the operating pressure. In general, it is better to minimize the operating temperature (down to about −20° F. for stream 8) as this lowers the $NH_3$ vapor pressure and reduces the quantity of $NH_3$ in the make-up gas and ultimately, the concentration of $NH_3$ in the converter feed gas fed by stream 12 to ammonia converter 60. Minimum energy requirement occurs when the $NH_3$ concentration rise across the converter is maximized. Also, a lower compressor inlet temperature reduces the inlet volumetric flow, power requirement and speed as discussed elsewhere. In case the temperature from exchanger 52 is relatively high (e.g., when it is not a refrigerated chiller), it will be prudent to provide further cooling to lower the temperature of stream 6 to about 40° F.

There can also be some variability with regard to the amount of scrubbing liquid used in stream 25 sent to the top of dehydrator 54. It has to be at least equal to the amount of $NH_3$ vaporized to avoid evaporation to dryness in the dehydrator. In practice, a certain margin will be added to the calculated minimum so the quantity should be at least 10% of stream 23 leaving the separator 67. When the temperature of stream 25 is very close to dehydrator 54 top temperature (e.g., −10° F.), the quantity of scrubbing liquid supplied by stream 25/26 has little effect on the dehydrator heat balance, so its flow should be in the 10 to 15% range of stream 23. When stream 25 temperature is warmer (e.g., −2° F.), its flow should be reduced to about 10–15% of stream 23, as greater amounts cause a slight warming trend with a little more $NH_3$ going overhead. When stream 25 temperature is colder (e.g., −18° F.), its flow can be increased to at least 15 to 20% of stream 23, since increased amounts of flow give a cooling trend reducing the $NH_3$ concentration in the dehydrator overhead.

The dehydrator 54 may be a column using a small number of trays (preferably bubble cap) with a sump in the bottom containing liquid $NH_3$ maintained under level control. A kick-back cooler (not shown in the FIGURE) for the synthesis gas compressor may be included to handle operation under recycle conditions (during startup). Installation of a separator (not shown in the FIGURE) at the discharge of the compressor may be necessary to remove oil in the unlikely event of oil carryover from the compressor. An $NH_3$ pump is not needed to supply the liquid ammonia to dehydrator 54 for the scrubbing step. This is because the dehydrator 54 is operated at medium pressure, well below the pressure of separator 67 which supplies the liquid $NH_3$. This is a significant improvement over the prior art high pressure scrubber variation that requires a pump plus a spare. For example, in a nominal 2000 psia synthesis loop, separator 67 will be at a pressure of about 1950 psia while dehydrator 54 is at a pressure of about 800–900 psia. It should be noted that the scrubbing is confined to the make-up stream alone, and is not required for the combined make-up/recycle stream as required in, for example, U.S. Pat. No. 1,830,167 and Canadian Patent 257,043.

Some synthesis loop piping modifications will be necessary for a retrofit of the dehydrator of the present invention into an existing plant, but not, of course, for a new plant. The compressor recycle wheel discharge is connected to the tubeside inlet of heat exchanger 59. Converter effluent from the shellside of exchanger 59 is routed to exchanger 62 inlet. Flash gas from separator 67, after flowing through the tubeside of exchanger 66 and after purge withdrawal, is then routed to the recycle wheel inlet. Small liquid $NH_3$ lines from separator 67 to the dehydrator 54 and from the bottom of the dehydrator to drum 69 are required.

The present invention has one or more of the following characteristics and advantages over prior art processing schemes.

Synthesis make-up gas purification is thus attained in a single step (in the dehydrator), as opposed to using multiple steps as in the prior art. In contrast, U.S. Pat. No. 3,349,569 shows that $NH_3$ is condensed after the suction scrubber between stages of the compressor to wash and further purify the gas. The present invention reduces capital and operating costs by avoidance of added compressor interstage refrigeration requirements, as required, for example, in the scheme of U.S. Pat. No. 3,349,569. Further, undesirable recycle of $NH_3$ to the front end of the plant, such as occurs with the suction scrubber of U.S. Pat. No. 3,349,569, is avoided.

A reduction in the speed of the synthesis gas compressor is obtained by diverting to the dehydrator gas taken from an intermediate stage of the compressor; more specifically, by diverting the dehydrator gas from between the first and second stages of the compressor. For example, with reference to the FIGURE, there is diverted as dehydrator gas the gas exiting from first stage 50 of the compressor. The diverted gas is, as described above, cooled in heat exchanger 52 and dehydrated in dehydrator 54 before being flowed via stream 8 to the second stage 56 of the compressor, at a temperature of about −23.3° C. (−10° F.). This results in load reduction for both the second stage and the third stage ("recycle wheel") of the compressor, as described in more detail below. This benefit is not obtained with prior art processing scheme configurations. The second stage inlet temperature is cooler, approximately −10° F., at the exit from the dehydrator, as compared to about 40–45° F. for a standard prior art design. The cooler temperature reduces the compression load for the second stage. Also, the second stage discharge temperature is correspondingly lower, as it is determined from the equation $T_2 = T_1 * (P_2/P_1)^{(n-1)/n}$ wherein $T_1$=inlet temperature, $T_2$=outlet temperature, $P_1$=inlet pressure, $P_2$=outlet pressure and $(n-1)/n = (k-1)/(k*ep)$ where $k=C_p/C_v$ and ep=polytropic efficiency of the compressor. $C_p$=specific heat at constant pressure while $C_v$=specific heat at constant volume.

A lower inlet temperature results in a lower discharge temperature. This means that the mixed inlet temperature to the recycle wheel is lower than the standard prior art design, since there is no cooling of the second stage discharge before mixing with recycle. Integration of the dehydrator into the process can increase the production capacity by about 3–4% if the synthesis gas compressor drive power output limits production, and by about 8–9% if the refrigeration compressor drive power output limits production. Integration of the dehydrator into the process provides mild operating conditions relative to prior art schemes, which means that no special low temperature materials of construction (those designed for temperatures of less than −20° F.) are required.

Integration of the dehydrator into the process reduces synthesis loop pressure drop which is about 5% lower than the suction scrubber of U.S. Pat. No. 3,349,569. In the system of the present invention, the $NH_3$ content of the dehydrator overhead discharge is 3.5% (vs. 4.9% for the suction scrubber) and the $NH_3$ content of the converter feed is lower, e.g., 2.3% versus 2.6% for the suction scrubber. This results in reduced circulation for a given capacity and, therefore, lower pressure drop.

Safe and continuous operation of the converter is assured since the moisture removal will be at least as complete (if not more so) than it is with prior art designs. Water removal will be accomplished in a dehydrator comprising a specially designed tower dedicated to that purpose rather than as it is now by random contact with liquid $NH_3$ as the compressor discharge stream flows through the chillers and piping to the separator. The latter approach is illustrated by U.S. Pat. No. 1,815,243.

The dehydrator of the present invention is connected to treat only the make-up gas instead of the combined make-up and recycle stream as shown, for example, in U.S. Pat. No. 1,830,167 and Canadian Patent 257,043. This greatly reduces its size and cost.

The dehydrator operation is continuous and therefore much simpler than with prior art systems using molecular sieves. There are no expensive and high-maintenance switching valves required in the system of the present invention as is the case with a molecular sieve process scheme. Further, the installed cost of the system of the present invention is much (60–70%) less than a molecular sieve system. The dehydrator energy saving is comparable to that achieved with a molecular sieve system.

The dehydrator water-removal scrubbing step is, as noted above, advantageously located between the first two stages of the synthesis gas compressor. Intermediate stage dehydration is superior for a number of reasons including reduced energy requirements, reduced synthesis gas compressor speed requirements and increased production.

The elevated pressure at which the dehydrator of the present invention operates (e.g., about 800–900 psia) is satisfactory to achieve adequate and essentially complete $H_2O$ removal without resorting to further contact with liquid $NH_3$. Use of the dehydrator to scrub make-up synthesis gas with liquid $NH_3$ at elevated pressure removes impurities (mainly $H_2O$ but also trace amounts of CO and $CO_2$) to render the make-up synthesis gas suitable for catalytic $NH_3$ synthesis. The $H_2O$ removal is essentially complete with only 0.1 ppm remaining after only one theoretical stage of liquid-gas contact in the dehydrator, leading to satisfactory converter performance and long catalyst life. Standard ammonia converter catalyst vendors specify a maximum atomic oxygen content of 3 ppm in the feed stream. The most common synthesis loop systems employ a secondary flash (see U.S. Pat. No. 1,815,243 and 3,350,170) and rely on the contact between condensing $NH_3$ and synthesis gas in the exchangers and piping to accomplish $H_2O$ removal. It has been found that the $H_2O$ removal with that prior art method is far from complete, with some measurements indicating a level of 15 ppm $H_2O$ in the converter feed. While this is marginally satisfactory for standard ammonia synthesis catalysts (although it contributes to shorter catalyst life), it is not acceptable for recently developed precious metal ammonia synthesis catalysts.

In accordance with the present invention, the synthesis loop is reconfigured for optimal operation and maximum energy saving. As a result of use of the dehydrator to dry the interstage synthesis gas, $H_2O$ has been removed so reconfiguration of the synthesis loop is possible. The scrubbed make-up gas can be mixed with $NH_3$ lean recycle gas and fed directly to the ammonia converter (60 in the FIGURE). Ammonia converter effluent can be then sent directly to the cooling/chilling steps (avoiding dilution with make-up gas) and saving refrigeration power. Recycle gas after $NH_3$ removal (in separator 67 of the FIGURE) and after purge withdrawal (via line 32 of the FIGURE) is then routed to the third (recycle) stage of the compressor. Product $NH_3$ is not compressed in the recycle stage, which saves power. Also, reconfiguration of the synthesis loop results in a lower synthesis gas compressor discharge pressure for a fixed ammonia converter outlet pressure. This occurs because there are fewer pieces of equipment between the compressor and the converter than with prior art schemes. This is one of the factors which reduces power and contributes to a lower energy consumption. A major reason for reduced energy consumption in the reconfigured loop is that the extra $NH_3$ introduced via the dehydrator can be condensed in the loop with cooling water rather than by refrigerated chillers because of the elevated converter effluent dew point. Thus, a large gain is made in the synthesis gas compressor power without sacrificing power in the refrigeration compressor. Such reconfiguration of the ammonia synthesis loop also allows greater heat recovery in the heat exchanger (item 61 in the FIGURE) used to heat boiler feed water by heat exchange with the effluent of the ammonia converter (item 60 in the FIGURE) since energy input into the third stage, or recycle wheel (item 57 of the FIGURE) of the compressor is directed to the ammonia converter. In contrast, prior art designs such energy is instead directed to a cooling water exchanger as in secondary flash designs such as those of U.S. Pat. Nos. 1,815,243 and 3,350,170. A further gain realized by reconfiguring the synthesis loop is elimination of the purge gas chiller and its separator. This saves capital in a new design and saves energy whether the design is new or a retrofit. The reason for this is that the purge gas is chilled by successively colder levels of refrigeration in the synthesis loop reconfigured in accordance with the practices of the present invention, while it is chilled by only the coldest level in the prior art designs. Overall, a significant total energy saving of about 0.5 MM Btu/ST of product results from utilization of the interstage dehydrator of the present invention ("ST"=short ton or 2000 pounds of product $NH_3$).

Even where the original synthesis loop configuration is retained, the dehydrator (54 in the FIGURE) positioned between the first (50 in the FIGURE) and second (56 in the FIGURE) compressor stages may be used to advantage for the removal of water (and other impurities) from the synthesis gas. Without the benefit of appreciable energy saving attained by reconfiguring the synthesis loop as described above, the energy saved in the synthesis gas compressor is mostly offset by higher refrigeration power requirements. The main gain in this case will be a significant improvement in the converter catalyst life due to lower $H_2O$ content. Also, load will be transferred from the synthesis gas compressor to the refrigeration compressor. A speed reduction of about 2% will be realized for the synthesis gas compressor. This can be advantageous in plants where the synthesis gas compressor is limiting and there is extra capacity available in the refrigeration compressor (e.g., in cold climates or winter in warm climates). More plant capacity can be obtained under these conditions.

In accordance with the practices of the present invention, the scrubbing step is located between the first two stages (50 and 56 in the FIGURE) of the synthesis gas compressor. This position is superior for a number of reasons including reducing the energy requirements, reducing the synthesis gas compressor speed requirement and increasing product production. Mild operating conditions mean that no special low temperature materials are required, and in revamping of existing plants the existing metallurgy can be retained. In new plants, low-temperature metallurgy requirements are reduced. Withdrawal and dehydrating and cooling between the first and second stages avoids undesirable recycle of $NH_3$ to the front end of the plant that occurs when a suction scrubber is used, as in Nebgen U.S. Pat. No. 3,349,569).

The elevated pressure of the dehydrator (about 800–900 psia) is satisfactory to achieve adequate and essentially complete $H_2O$ removal without resorting to further contact with liquid $NH_3$ as in U.S. Pat. No. 3,349,569.

Extensive interstage refrigeration requirements are avoided by the practices of the present invention, as there is no need to cool and extensively chill the compressor interstage gas to condense $NH_3$. In contrast, the refrigeration power expended to achieve the deep cooling of −5 to −50° C. (23 to −58° F.) mentioned in U.S. Pat. No. 3,349,569 would equal or exceed the power saved for the synthesis gas compressor in that scheme. Also, the extensive investment required by the prior art design is avoided. For a retrofit (revamp of an existing plant), the existing heat exchangers upstream of the dehydrator can be used.

The interstage cooling of synthesis gas between the first and second stages beneficially affects two stages of the synthesis gas compressor instead of just one. Equipment modification is readily made to the most commonly employed compressor design which incorporates the second stage and the third stage (recycle) compressor in the same case, with the recycle wheel compressing the combined make-up and recycle synthesis gas stream. The chilled gas from the dehydrator enters the second stage of the compressor and, after compression, the discharge temperature is cooler since it is set by the relationship $T_2 = T_1{}^*(P_2/P_1)^{(n-1)/n}$. This stream, without further cooling, is then mixed with recycle so the combined stream temperature is lower. Lower inlet temperatures to the second and third stages result in lower power requirements for both stages since they are set by the well-known polytropic relationship $P = K/ep*MPH*T_1*Z*n/(n-1))*P_2/P_1{}^{(n-1)/n}-1)$ wherein P=power, K is a constant, MPH=molar flow in moles per hour, Z=compressibility, and ep, n, $P_1$, $P_2$ and $T_1$ are as defined above. Cooling of the second stage inlet more than offsets the increased molar flow as shown below, where a 7% power saving is obtained for that stage alone. Other factors in the above equation are essentially constant, giving $$P=(460-10)/(460+41)*(1.035/1.000)=0.93$$

For the recycle stage, the inlet temperature is lower for the reason mentioned above. Also, the inlet temperature and flow (since the product $NH_3$ is not compressed) are advantageously influenced by the loop reconfiguration, so a 12% power saving is realized, as shown by the following calculation.

$$P=(460+114)/(460+150)*(0.935/1.000)=0.88$$

In addition, the recycle power is reduced somewhat further owing to lower pressure drop. The first-stage power will be about the same, so the overall power reduction for the synthesis gas compressor is about 6%. This is shown simplistically by $$P=(1.0*0.36)+(0.93*0.36)+(0.88*0.28)=0.941$$

Of course, there is some redistribution of power between stages to satisfy the compressor performance curves when the dehydrator is employed. This results in a lower pressure ratio for the first stage and a correspondingly higher pressure ratio for the second stage. Still, the overall power saving remains approximately 6%. The inlet volumetric flows are also less, resulting in lower compressor speed (about 3% with a reconfigured synthesis loop) and consequently, lower operating severity. This advantage (dehydrator positively affecting two stages) is not realized with the prior art designs.

Liquid $NH_3$ is supplied to the scrubbing step from a downstream separator at higher pressure. A pump is not required during normal operation.

Scrubbing is confined to the make-up stream alone, not the combined make-up plus recycle stream as presented in U.S. Pat. Nos. 1,830,167 and 257,043. (It is noted that in U.S. Pat. No. 3,349,569 only the make-up stream is scrubbed.)

Synthesis loop pressure drop is lower than with a suction scrubber, e.g., as shown in U.S. Pat. No. 3,349,569, assuming that there is no further $NH_3$ condensation between stages. This is because of the lower $NH_3$ concentration in the overhead of the dehydrator (54) as compared to that in the prior art suction scrubber (3.5% vs. 4.9%), and because of higher pressure (850 vs. 350 psia) in the dehydrator as compared to that of the prior art suction scrubber. The $NH_3$ concentration in the feed to the ammonia converter (60) is therefore lower (2.3% vs. 2.6%) than in the prior art scheme. With a fixed $NH_3$ concentration in the converter outlet, there will be a larger change in concentration across the converter in the scheme of the present invention as compared to that of U.S. Pat. No. 3,349,569, which translates into a lower circulation for a given capacity and lower pressure drop. This also results in a lower recycle power requirement.

The amount of liquid $NH_3$ used for scrubbing should normally be between 10–15% of the total liquid from the high pressure separator. By reducing the quantity of liquid ammonia used, the reintroduction of inerts to the synthesis loop is reduced, as is the size and cost of the liquid piping, valves and scrubbing equipment.

The make-up gas is precooled (usually to about 38–45° F. in a refrigerated chiller) prior to scrubbing. The precooling is followed by a knockout drum to remove condensed $H_2O$. This reduces the $H_2O$ content of the saturated gas and the load on the scrubber. Precooling also lowers the $NH_3$ content of the dehydrator overhead vapor and consequently, the $NH_3$ content of the converter feed. Further, it reduces the overhead temperature with the favorable effect on compressor power and speed already alluded to.

A less common design of ammonia synthesis plant uses a 2500–3000 psia synthesis loop that employs a four-stage compressor (three make-up stages and one recycle stage). Usually, two make-up stages are contained in the first case of the compressor and the second case of the compressor is of a four-nozzle design. Here, a dehydrator such as dehydrator 54 could be located after the first make-up stage, after the second make-up stage, or at synthesis loop pressure after the third make-up stage. In short, the make-up synthesis gas may be taken from the compressor to the dehydrator from any intermediate compression stage and returned to the compressor at the inlet to the next stage.

Preferably, however, in such case the gas should be taken after the second make-up stage for three reasons. At that stage of compression, the pressure would be high enough to insure adequate $H_2O$ removal. At the same time, the chilling effect would benefit the third makeup compression stage, thereby lowering its power requirement and speed. Finally, in revamping existing plants, a chiller is already present at this location.

For such higher pressure synthesis loops (2500–3000 psia), the dehydrator will better be placed between the second and third stages of the compressor and operate at a pressure of about 1200–1400 psia. Thus, in such four-stage compressor configurations, the synthesis gas is discharged from the second stage of the compressor at about 1200 to 1400 psia, and is discharged from the fourth stage of the compressor at a pressure of about 2500 to 3000 psia.

Those skilled in the art will appreciate that numerous variations may be made to the specific embodiments described above, which variations nonetheless lie within the scope of the present invention as defined in the appended claims.

What is claimed is:

1. In a process for the manufacture of ammonia by compressing in a multi-stage compressor a synthesis gas comprising hydrogen and nitrogen, each stage of the compressor having an inlet and a discharge associated therewith, contacting the compressed synthesis gas in an ammonia reactor with a suitable catalyst under conditions to promote the reaction of a portion, less than all, of the hydrogen and nitrogen in the synthesis gas to ammonia, separating product ammonia from a reactor effluent stream discharged from the ammonia converter, and recycling a portion of the reactor effluent stream containing unreacted hydrogen and nitrogen to the multi-stage compressor, withdrawing a make-up synthesis gas stream from the compressor, cooling and dehydrating the withdrawn synthesis gas stream, the dehydrating step being carried out by contacting the withdrawn synthesis gas stream with liquid ammonia, and returning the cooled and dehydrated synthesis gas stream to the compressor, the improvement comprising that the withdrawn synthesis gas stream is withdrawn from the discharge of the first stage of the compressor and returned to the compressor at the inlet of the second stage of the compressor.

2. The process of claim 1 wherein the entire synthesis gas stream is withdrawn from the discharge of the first stage of the compressor and cooled and dehydrated.

3. The process of claim 1 or claim 2 wherein the multi-stage compressor is a three-stage compressor and the make-up synthesis gas is discharged from the first stage at a pressure of from about 800 to 900 psia, is discharged from the second stage at a pressure of about 1800 to 1900 psia, and is discharged from the third stage of the compressor at a pressure of about 2000 to 2100 psia.

4. The process of claim 3 wherein no cooling is imposed on the make-up synthesis gas between the second and third stages of the compressor.

5. The process of claim 3 wherein the synthesis gas stream is cooled to a temperature of from about −20.5 to −26.1° C. (−5 to −15° F.) prior to being returned to the compressor.

6. The process of claim 1 or claim 2 wherein the synthesis gas stream is returned to the compressor from the dehydrator without being rewarmed.

7. The process of claim 3 wherein the $H_2O$ content of the withdrawn synthesis gas stream is reduced to less than 0.1 parts per million by volume prior to being returned to the compressor.

8. The process of claim 1 or claim 2 wherein the synthesis gas contains hydrogen and nitrogen in a molar ratio of about 3:1.

9. The process of claim 1 or claim 2 further comprising cooling the synthesis gas withdrawn from the compressor to condense ammonia contained therein and removing the condensed ammonia from the synthesis gas prior to introducing it into the ammonia converter.

10. An apparatus for carrying out a process for the manufacture of ammonia by compressing in a multi-stage compressor having at least a first stage and a second stage a synthesis gas comprising hydrogen and nitrogen, each stage of the compressor having an inlet and a discharge associated therewith, the process comprising contacting the compressed synthesis gas in an ammonia reactor by contacting the compressed synthesis gas with a suitable catalyst under conditions to promote the reaction of a portion, less than all, of the hydrogen and nitrogen in the synthesis gas to ammonia, separating product ammonia from a reactor effluent stream discharged from the ammonia converter, and recycling a portion of the reactor effluent stream containing unreacted hydrogen and nitrogen to the multi-stage compressor, and contacting the synthesis gas with liquid ammonia in a dehydrator having a make-up synthesis gas inlet, a synthesis gas outlet and a liquid ammonia inlet and a liquid ammonia outlet, the improvement comprising that the compressor is fitted with a synthesis gas outlet connecting in flow communication the discharge of the first stage with the synthesis gas inlet of the dehydrator, a synthesis gas intermediate inlet connecting the inlet of the second stage in flow communication with the synthesis gas outlet of the dehydrator, whereby to define a synthesis gas flow path from the discharge of the first stage, through the dehydrator, thence to the inlet of the second stage.

11. The apparatus of claim 10 wherein the synthesis gas and liquid ammonia inlets and outlets are arranged to flow the liquid ammonia countercurrently to the synthesis gas in the dehydrator.

12. The apparatus of claim 10 or claim 11 further comprising a heat exchanger to cool the synthesis gas and a liquid-vapor separator to separate $H_2O$ therefrom disposed in the synthesis gas flow path between the first stage of the compressor and the synthesis gas inlet of the dehydrator.

* * * * *